(12) United States Patent
Muñoz et al.

(10) Patent No.: US 11,906,051 B2
(45) Date of Patent: Feb. 20, 2024

(54) INTERNAL COMBUSTION ENGINE

(71) Applicant: NISSAN NORTH AMERICA, INC., Franklin, TN (US)

(72) Inventors: Williams Muñoz, Estado de México (MX); Jaime Lopez Ku, Estado de México (MX)

(73) Assignee: Nissan North America Inc., Franklin, TN (US)

( * ) Notice: Subject to any disclaimer, the term of this patent is extended or adjusted under 35 U.S.C. 154(b) by 8 days.

(21) Appl. No.: 17/515,186

(22) Filed: Oct. 29, 2021

(65) Prior Publication Data
US 2023/0137241 A1    May 4, 2023

(51) Int. Cl.
*F16J 9/24* (2006.01)
*F02F 3/00* (2006.01)
*F16J 9/26* (2006.01)

(52) U.S. Cl.
CPC ............. *F16J 9/24* (2013.01); *F02F 3/00* (2013.01); *F16J 9/26* (2013.01)

(58) Field of Classification Search
CPC . F16J 9/24; F16J 9/26; F02F 3/00; F02F 5/00
USPC ........................................ 123/193.4
See application file for complete search history.

(56) References Cited

U.S. PATENT DOCUMENTS

| | | | | |
|---|---|---|---|---|
| 5,664,536 | A | * | 9/1997 | Bigsby ............... F16J 9/24 277/449 |
| 2015/0007791 | A1 | * | 1/2015 | Dellora ............... F16J 9/24 123/193.4 |
| 2016/0040780 | A1 | * | 2/2016 | Donahue ............. F16J 9/064 123/193.4 |

* cited by examiner

*Primary Examiner* — Lindsay M Low
*Assistant Examiner* — Omar Morales
(74) *Attorney, Agent, or Firm* — Global IP Counselors, LLP

(57) ABSTRACT

An internal combustion engine includes a combustion chamber, a piston a plurality of piston rings. The combustion chamber has a bore wall. The piston is configured to move relative to the bore wall. The plurality of piston rings is provided to the piston. Each of the piston rings has a main body that is circular. Each of the pistons rings further has a stopper that protrudes from the main body.

10 Claims, 5 Drawing Sheets

INTERNAL COMBUSTION ENGINE

BACKGROUND

Field of the Invention

The present invention generally relates to an internal combustion engine. More specifically, the present invention relates to an internal combustion engine having a plurality of piston rings.

Background Information

Piston rings seal are provided to internal combustion engine cylinders so that combustion gas generated at the time of ignition does not leak into the opening between the piston and the cylinder. The piston moves inside the engine at a rate of several thousand times per minute. Therefore, a small amount of oil is provided over the pistons so they move smoothly, with little friction between metal and metal. When gas ignition takes place, the temperature inside a piston reaches a very high heat. Piston rings can release heat build-up by dissipating the heat to the cylinder. Piston rings support pistons to allow for movement of the piston.

SUMMARY

In view of the state of the known technology, one aspect of the present disclosure is to provide an internal combustion engine comprises a combustion chamber, a piston a plurality of piston rings. The combustion chamber has a bore wall. The piston is configured to move relative to the bore wall. The plurality of piston rings is provided to the piston. Each of the piston rings has a main body that is circular. Each of the pistons rings further has a stopper that protrudes from the main body.

Also other objects, features, aspects and advantages of the disclosed internal combustion engine will become apparent to those skilled in the art from the following detailed description, which, taken in conjunction with the annexed drawings, discloses one embodiment of the internal combustion engine.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
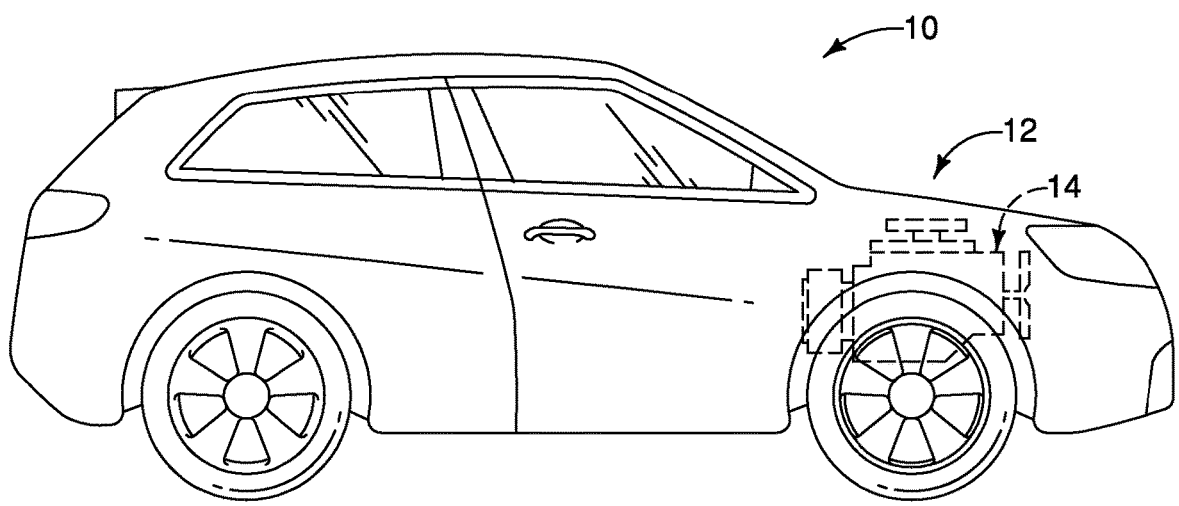
FIG. 1 is a schematic side view of a vehicle equipped with an internal combustion engine.

Referring initially to FIG. 1, a vehicle 10 is provided with an internal combustion engine 12. The internal combustion engine 12 is a heat engine in which the combustion of a fuel occurs with an oxidizer (usually air) in a combustion. A internal combustion engine 12 can be a spark-ignited internal combustion engine 12, or a compression-ignited systems. In a spark-ignited combustion engine, the fuel is injected into a combustion chamber 14 and combined with air to create combustion. The expansion of high-temperature and high-pressure gases produced by combustion applies direct force to some component of the engine. This combustion force is applied to one or more pistons, turbine blades, a rotor, or a nozzle.

Therefore, the internal combustion of the illustrated embodiment comprises a combustion chamber 14 and a piston 16. In the illustrated embodiment, the internal combustion engine 12 further comprises a plurality of piston rings 18 that are provided to the piston 16.

Figure 2:
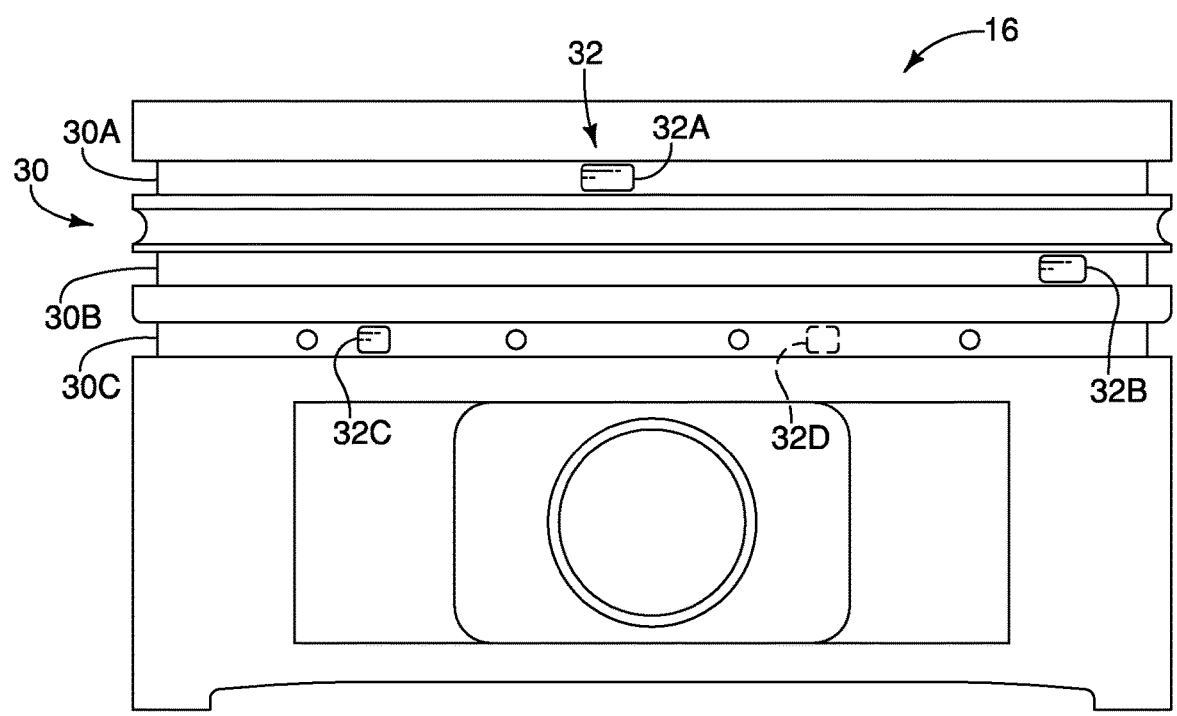
FIG. 2 is a side view of a piston of the internal combustion engine of FIG. 1.
Figure 3:
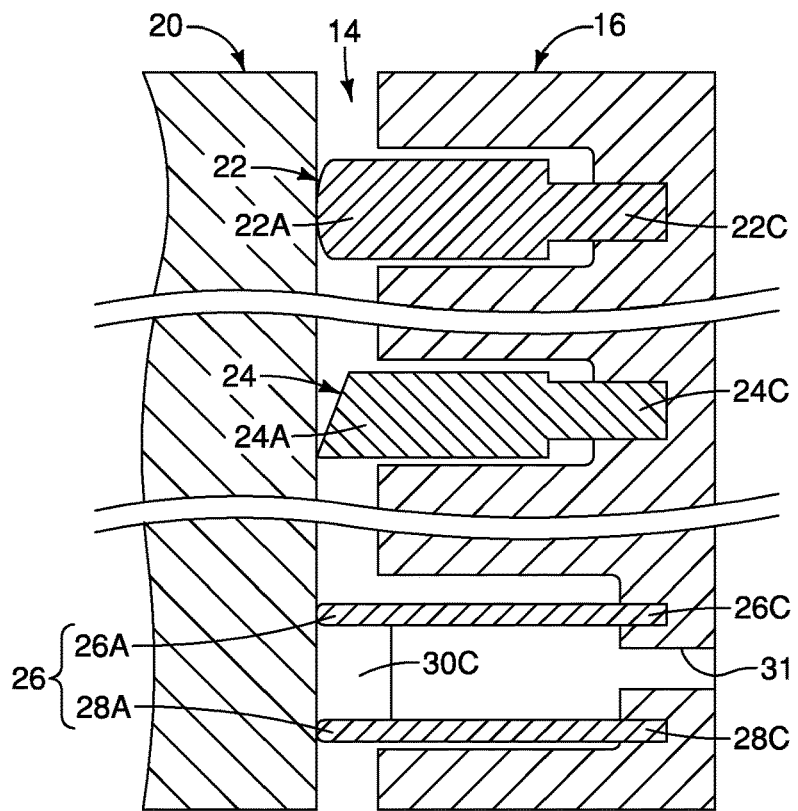
FIG. 3 is a series of cross-sectional views of the internal combustion engine with a plurality of piston rings.
Figure 5:
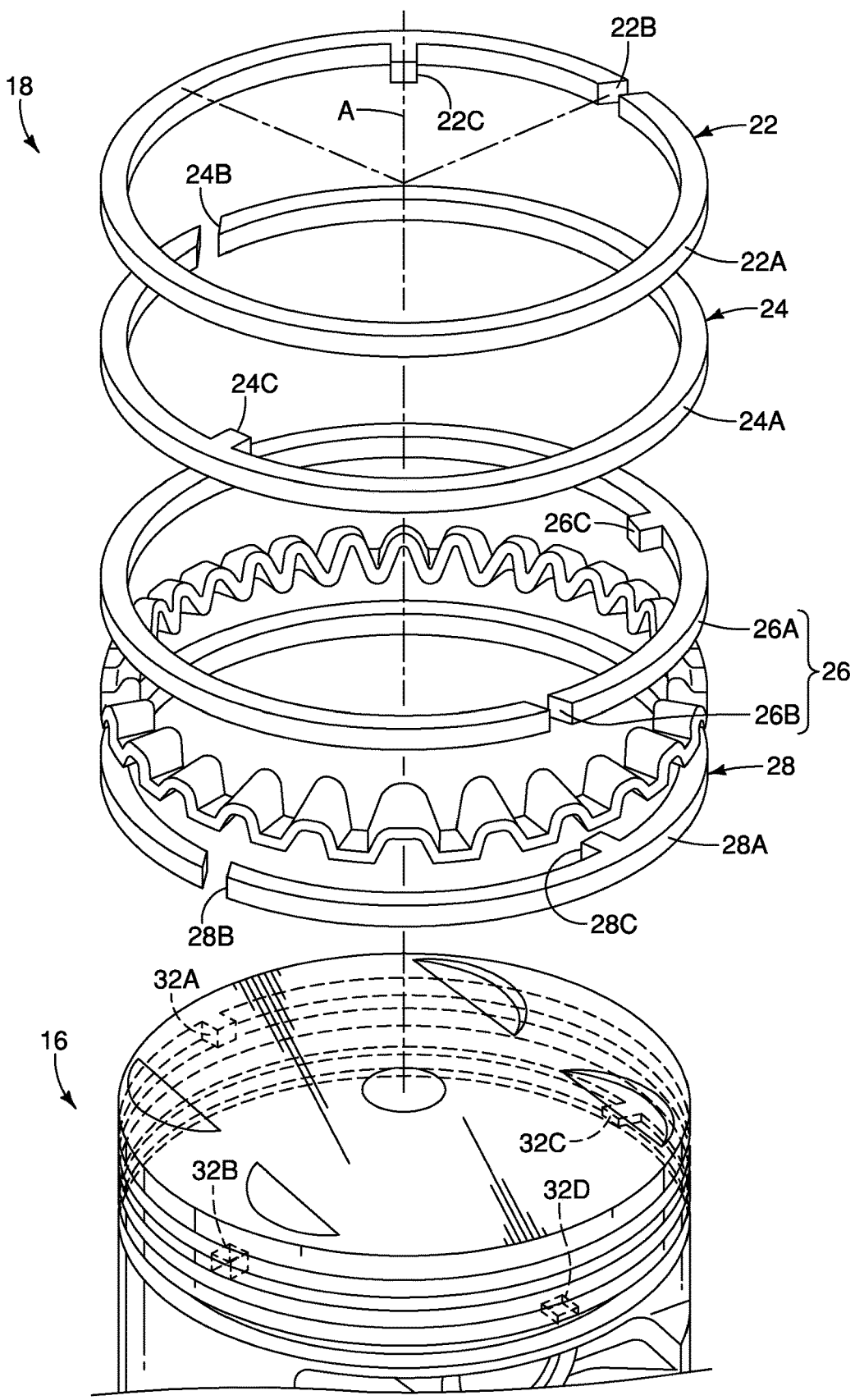
FIG. 5 is an exploded view of the piston rings and the piston.

As best seen in FIGS. 2 and 3, the combustion chamber 14 has a bore wall 20 (e.g., a cylinder wall) that defines the internal space of the combustion chamber 14. In particular, the bore wall 20 defines an inner diameter of the combustion chamber 14. The gas pressure in the combustion chamber 14 exerts a force on the piston 16. The piston 16 is configured to move relative to the bore wall 20 along a center axis A, as shown in FIG. 5.

The piston rings 18 are fitted around the piston 16 to prevent the gases from leaking into the crankcase or the oil leaking into the combustion chamber 14. In particular, the piston rings 18 include a first ring 22 that is a top ring, a second ring 24 that is a middle ring and a third ring 26 that is a bottom ring. The piston rings 18 operate move with the piston 16 to reduce blowby gases from escaping into the combustion chamber 14. The piston rings 18 are further provided to the piston 16 to maintain a desired lubrication for the piston's 16 movement inside the combustion chamber 14.

Figure 6:
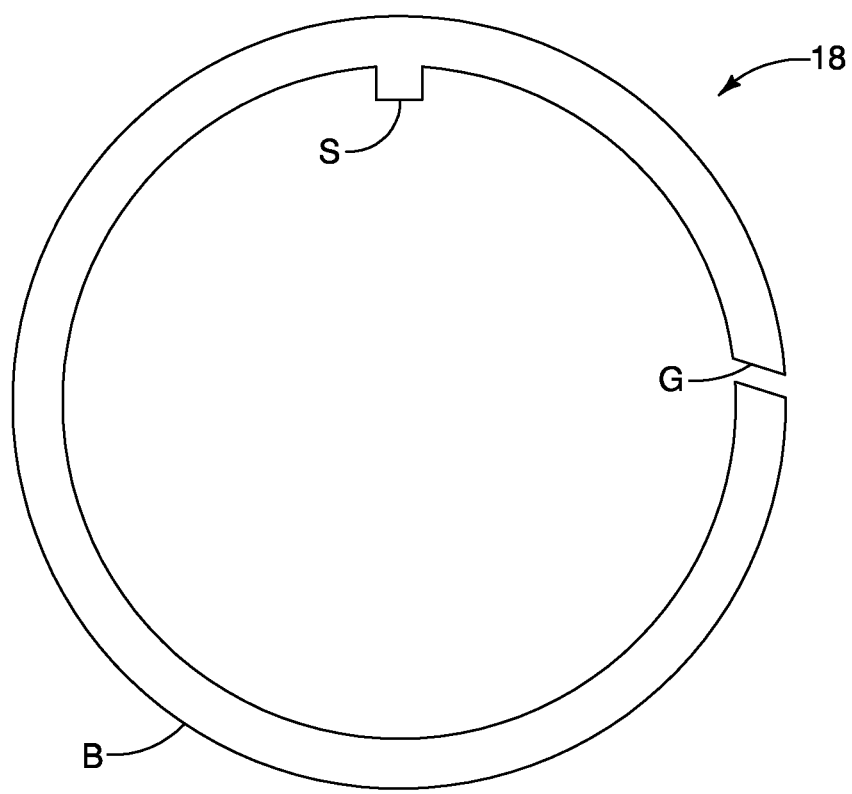
FIG. 6 is a schematic diagrammatic view of a representative piston ring of the piston rings.

As seen in FIG. 6, each of the piston rings 18 has a main body B that is circular. The circular main body B is fitted around the piston 16. As best seen in FIG. 5, the main body B of each of the piston rings 18 includes an installation gap G that is needed to enable free expansion of the piston rings 18 due to rising temperature inside the combustion chamber 14 during operation. Therefore, the piston rings 18 are premade with installation gaps G, as will be further described below. In the illustrated embodiment, FIG. 6 diagrammatically represents each of the piston rings 18.

The installation gaps G basically define a space at around half a millimeters on the respective main body B to enable expansion of the main bodies due to increased temperature in the combustion chamber 14. The installation gaps G are preferably formed as breaks along the circumference of the piston rings 18. It will be apparent to those skilled in the vehicle field from this disclosure that the installation gaps G can have different sizes, shapes and configurations (e.g., ridges, steps, etc.) as needed and/or desired.

During movement of the piston 16, the piston rings 18 can rotate along the piston 16 such that the installation gaps G become vertically aligned along the piston ring 28. As a result, the vertical alignment of the installation gaps G results in unwanted blowby gases escaping through the space created by the aligned installation gaps G. Additionally, rotation of the piston rings 18 during piston 16 movement impedes the lubricating effect of the piston rings 18. In particular, the continuous movement of the piston rings 18 along the piston 16 creates friction between the piston rings 18 and the bore wall 20, which reduces the lubricating effect of the piston rings 18.

Figure 4:
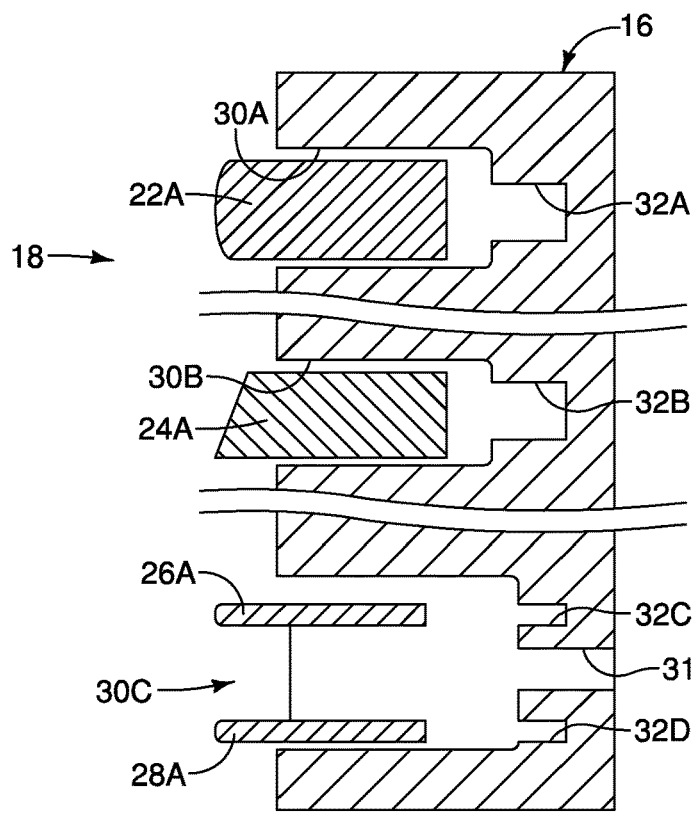
FIG. 4 is a series of cross-sectional views similar to FIG. 3 but the piston rings do not include stoppers.

In view of the above, the piston rings 18 are provided with stoppers S that fittedly engage with the piston 16 in order to prevent rotational movement of the piston rings 18 on the piston 16. That is, each of the piston 16 rings has a stopper S that protrudes from a respective main body, as will be further described below. Additionally, the piston 16 includes a plurality of grooves that receive the piston rings 18, as best seen in FIGS. 3 to 5.

That is, each of the piston grooves 30 includes a recess 32 that engage with a respective one of the stoppers S. Therefore, the piston 16 includes a plurality 32 of recesses that fittedly receive the stoppers S of the plurality of piston rings 18. In other words, the piston 16 of the illustrated embodiment is made with a plurality of recesses 32 that receive the stoppers S therein to retain the piston rings 18 in place, as will be described below.

Referring to FIGS. 3 to 6, the first ring 22 functions as a sealing ring. That is, the first ring 22 functions to seal against blowby gases crossing into the combustion chamber 14. Therefore, the first ring 22 presses tightly against the bore wall 20 and in order to seal the combustion chamber 14 so to keeping combustion gases from escaping. The first ring 22 is a topmost ring of the piston rings 18 along the piston 16. The first ring 22 is preferably made of a steel alloy that can be made from coiling a single elongated metal strip around a mandrel. The first ring 22 is made to withstand the high temperatures of the internal combustion engine 12.

The first ring 22 includes a first main body 22A that is fitted around the piston 16. The first main body 22A has a first gap 22B. The first ring 22 further includes a first stopper 22C that protrudes from the first main body 22A at a location circumferentially offset of the first gap 22B. In the illustrated embodiment, the first ring 22 can be made such that the first main body 22A is coiled with the first stopper 22C integrally formed thereon. That is, the first stopper 22C is preferably also a steel alloy that is integrally made with the first main body 22A.

As best seen in FIGS. 5 and 6, the first stopper 22C and the first gap 22B are circumferentially offset with respect to each other on the first main body 22A. In particular, the first stopper 22C and the first gap 22B are preferably spaced at approximately 90 degrees apart in the circumferential direction along the first main body 22A.

The piston rings 18 further includes a second ring 24 that functions as a temperature ring. That is, the second ring 24 can absorb the heat energy created during operation of the internal combustion engine 12 and operates to transfer the heat to the bore wall 20. The second ring 24 is preferably made of a steel alloy that can be made from casting, such as by a pot casting method. For example, a short cylinder of an oval cross-section is made and the second ring 24 is then cut and machined from the cylinder. The second ring 24 can be casted as a homogeneous and balanced cast to form the circumference of the second ring 24.

The second ring 24 includes a second main body 24A that has a second gap 24B. The second ring 24 further includes a second stopper 24C. In the illustrated embodiment, the second ring 24 can be made such that the second main body 24A is cast with the second stopper 24C integrally formed thereon. That is, the second stopper 24C is preferably also a steel alloy that is integrally made with the second main body 24A.

The second stopper 24C protrudes from the second main body 24A at a location that is circumferentially offset of the second gap 24B. In particular, the second stopper 24C and the second gap 24B are preferably spaced at approximately 90 degrees apart in the circumferential direction along the second main body 24A.

As seen in FIG. 5, the second ring 24 is positioned on the piston 16 such that the second gap 24B is circumferentially offset of the first gap 22B along the center axis A of the piston 16. Preferably, the first and second gaps 22B and 24B are offset by approximately 120 degrees in the circumferential direction of the piston 16. The second stopper 24C is also circumferentially offset of the first stopper 22C along the center axis A of the piston 16. In particular, the first and second stoppers 22C and 24C can be approximately 90 degrees offset with respect to each other in the circumferential direction of the piston 16. The first and second stoppers 22C and 24C are only offset with respect to each other to retain the first and second gaps 22B and 24B in the aligned position. Therefore, it will be apparent to those skilled in the vehicle field from this disclosure that the positioning of the first and second stoppers 22C and 24C on the respective first and second main bodies can vary so long as the first and second gaps 22B and 24B are sufficiently unaligned to prevent leakages along the piston 16.

The plurality of piston rings 18 includes a third ring 26 that is an oil ring. Therefore, the third ring 26 functions to scrap off the bore wall 20 as the piston 16 travels along the cylinder, depositing it back into an oil sump, as seen in FIGS. 3 and 4. The third ring 26 is preferably created by a coiling process that is similar to that of the first ring 22.

As best seen in FIG. 5, the third ring 26 includes a third main body 26A that has a third gap 26B. The third ring 26 further includes a third stopper 26C that protrudes from the third main body 26A at a location circumferentially offset of the third gap 26B. The third stopper 26C is preferably a metal stopper that can be integrally formed with the metal coil of the third main body 26A. The third stopper 26C and the third gap 26B are preferably approximately 90 degrees apart along the circumferential direction of the third main body 26A, as seen in FIGS. 5 and 6.

The third ring 26 includes a fourth main body 28A that has a fourth gap 28B. The third ring 26 further includes a fourth stopper 28C that protrudes from the fourth main body 28A at a location circumferentially offset that is of the fourth gap 28B. The fourth stopper 28C is preferably a metal stopper that is integrally formed with the metal coil of the fourth main body 28A. Therefore, the third ring 26 is defined by a pair of circular main bodies, the third and fourth main body 28A that together define the oil ring. The fourth stopper 28C and the fourth gap 28B are preferably approximately 90 degrees apart along the circumferential direction of the fourth main body 28A.

The third gap 26B is circumferentially offset of the first and second gaps 22B and 24B along the center axis A of the piston 16. The fourth gap 28B is also circumferentially offset of the first, second and third gap 26Bs along the center axis A of the piston 16. As stated, in the illustrated embodiment, the first and second gaps 22B and 24B are preferably separated by approximately 120 degrees along the circumferential direction with respect to each other. In the illustrated embodiment, the third and fourth gap 28Bs are preferably separated by approximately 120 degrees along the circumferential direction with respect to each other.

The third stopper 26C is circumferentially offset of the first and second stoppers 22C and 24C along the center axis A of the piston 16 so that the first, second and third gaps 22B, 24B and 26B do not become aligned during use. The fourth stopper 28C is also circumferentially offset of the first, second and third stopper 22C, 24C and 26C along the center axis A of the piston 16. In this way, the first to fourth gaps 22B, 24B 26B and 28B do not become aligned along the piston 16 during movement of the piston 16 due to the positioning of the stoppers S that engage with the piston 16.

It will be apparent to those skilled in the vehicle field from this disclosure that the positioning of the third and fourth stoppers 26C and 28C on the respective third and fourth rings 24 and 26 can vary so long as the third and fourth gaps 26B and 28B are sufficiently unaligned to prevent leakages along the piston 16. Further, the first, second and third rings 22, 24 and 26 are provided on the piston 16 to maximize the unalignment angles of the first, second, third and fourth gaps 22B, 24B, 26B and 28B.

As best seen in FIGS. 3 and 4, the piston 16 includes a first groove 30A that receives the first ring 22. In particular, the first groove 30A receives the first main body 22A. The first groove 30A includes a first recess 32A that receives the first stopper 22C therein. The first recess 32A fittedly receives the first stopper 22C such that the first stopper 22C cannot become dislodged from the first recess 32A as the piston 16 moves.

Similarly, the piston 16 further includes a second groove 30B that receives the second ring 24, with a corresponding second recess 32B that receives the second stopper 24C. The piston 16 further receives a third groove 30C that receives the third ring 26 with corresponding third and fourth recesses 32C and 32D that receive the third and fourth stoppers 26C and 28C, respectively. The grooves 30 and the recesses 32 can be machinated on the piston 16 by conventional means.

Figure 7:
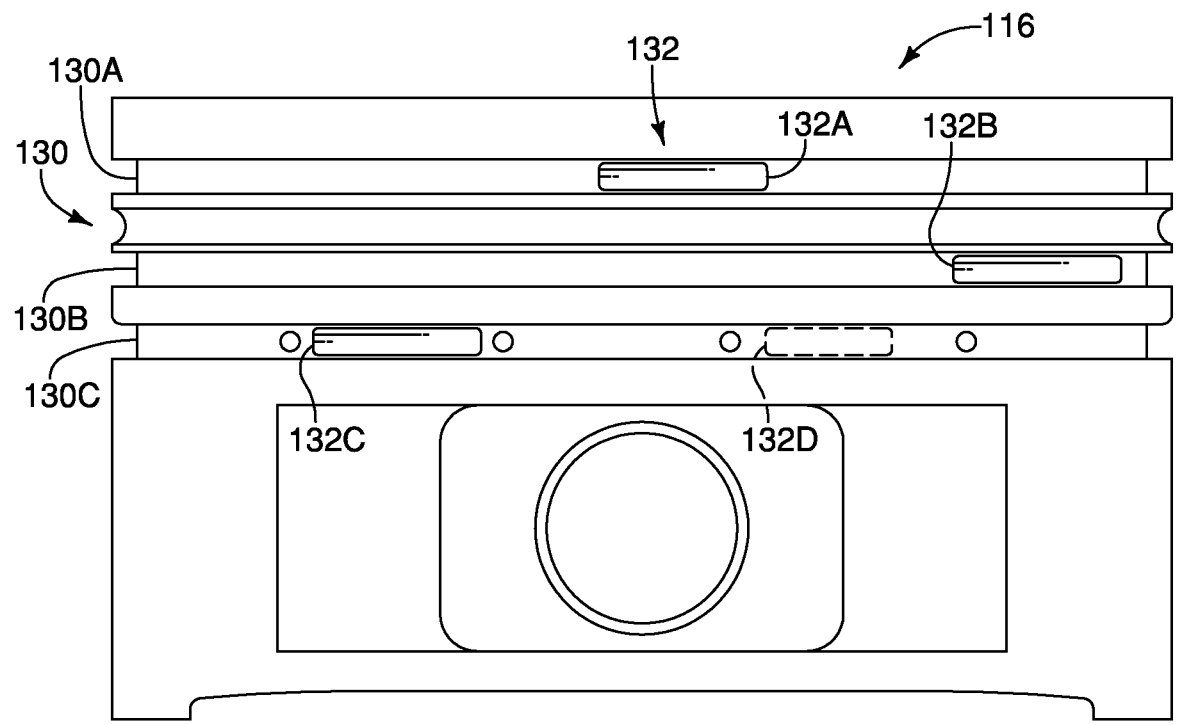
FIG. 7 is a side view of a modified piston that can be provided to the internal combustion engine.
Figure 8:
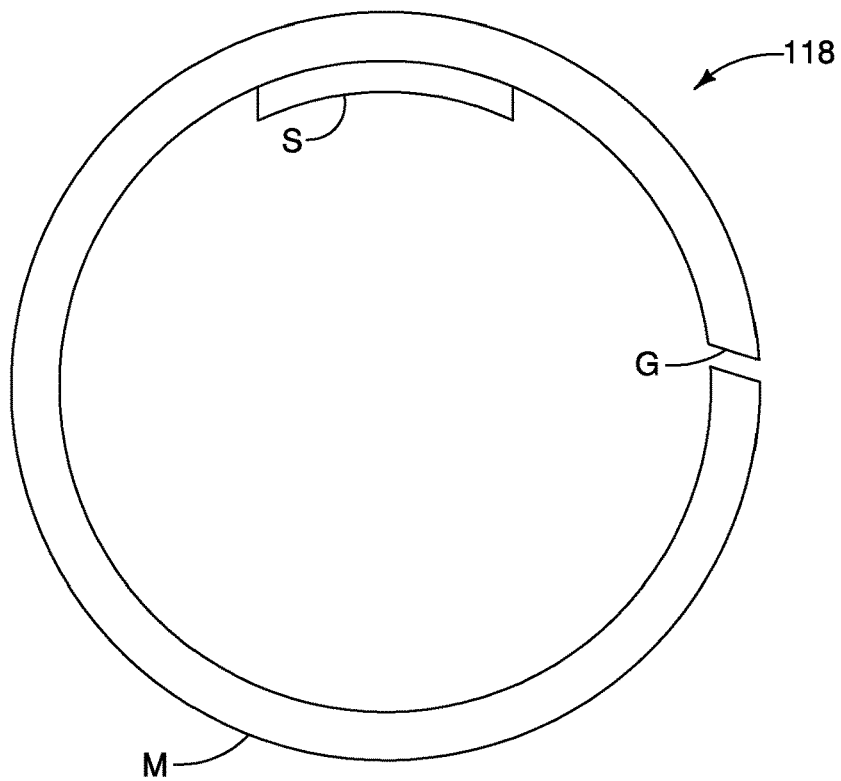
FIG. 8 is a schematic diagrammatic view of a representative modified piston ring of modified piston rings for the modified piston.
Figure 9:
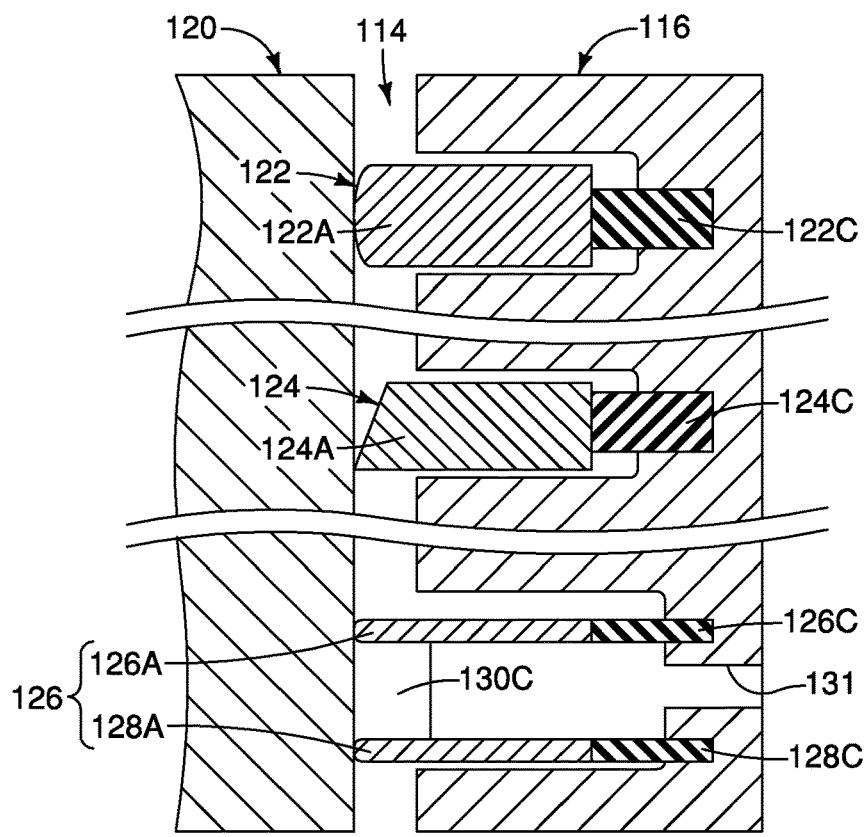
FIG. 9 is a series of cross-sectional views of the modified piston and the piston rings.

Referring to FIGS. 7 to 9, a modified internal combustion engine 12 having a modified piston 116 and a plurality of modified piston rings 118 will now be described here. Due to the similarity between the internal combustion engine 12 and the modified internal combustion engine 112, all corresponding components of the modified internal combustion engine 112 will receive the same reference numbers as the internal combustion engine 12 but increased by 100. The modified piston rings 118 include modified first, second and third rings 122, 124 and 126 that are substantially identical the first, second and third rings 22, 24 and 26. The only difference between the modified first, second and third rings 122, 124 and 126 and the first, second and third rings 22, 24 and 26sis that the modified first, second and third rings 122, 124 and 126 include modified stoppers 122C, 124C and 126C and 128C.

That is, the modified stoppers 122C, 124C and 126C and 128C are identical to the first, second, third and fourth stoppers 22C, 24C, 26C and 28C of the main embodiment except that the modified stoppers 122C, 124C and 126C and 128C include extended dimensions with respect to the first, second, third and fourth stopper 28Cs of the main embodiment. Additionally, the modified stoppers 122C, 124C and 126C and 128C are formed separately from the main bodies of the modified first, second and third rings 122, 124 and 126 and are subsequently adhered thereon, such as by welding. For example, the modified first, second, third and fourth stopper 122C, 124C, 126C and 128C can be metal plates that are welded to the main bodies of the modified first, second, third rings 122, 124 and 126. Therefore, the modified stoppers 122C, 124C and 126C and 128C are not integrally formed with the rest of the piston rings 18, as was described for the first, second and third rings 22, 24 and 26.

The modified piston 16 includes modified recesses 132A, 132B, 132C and 132D that receive the elongated stoppers 122C, 124C and 126C and 128C of the modified first, second and third rings 122, 124 and 126. Therefore, it will be apparent to those skilled in the vehicle field from this disclosure that the stoppers S can be modified to have different dimensions and that the recesses can be modified to have different dimensions to fittedly receive the stoppers S.

General Interpretation of Terms

In understanding the scope of the present invention, the term "comprising" and its derivatives, as used herein, are intended to be open ended terms that specify the presence of the stated features, elements, components and/or groups, but do not exclude the presence of other unstated features, elements, components and/or groups. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the internal combustion engine. Accordingly, these terms, as utilized to describe the present invention should be interpreted relative to a vehicle equipped with the internal combustion engine.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An internal combustion engine; comprising:
a combustion chamber having a bore wall;
a piston configured to move relative to the bore wall; and
a plurality of piston rings provided to the piston, each of the piston rings having a main body that is circular, each of the pistons rings further having a stopper that protrudes from the main body,
the plurality of piston rings including a first ring that is a seal ring,
the first ring including a first main body that has a first gap,
the first ring further including a first stopper that protrudes from the first main body at a location circumferentially offset of the first gap,
the plurality of piston rings including a second ring that is a temperature ring,
the second ring including a second main body that has a second gap, the second ring further including a second stopper that protrudes from the second main body at a location circumferentially offset of the second gap,
the second gap being circumferentially offset of the first gap along a center axis of the piston, the second stopper being circumferentially offset of the first stopper along the center axis of the piston.

2. The internal combustion engine according to claim 1, wherein
the plurality of piston rings includes a third ring that is an oil ring.

3. The internal combustion engine according to claim 1, wherein
the third ring includes a third main body that has a third gap, the third ring further includes a third stopper that protrudes from the third main body at a location circumferentially offset of the third gap.

4. The internal combustion engine according to claim 1, wherein
the third ring includes a fourth main body that has a fourth gap, the third ring further includes a fourth stopper that protrudes from the fourth main body at a location circumferentially offset of the fourth gap.

5. The internal combustion engine according to claim 1, wherein
the third gap is circumferentially offset of the first and second gaps along the center axis of the piston.

6. The internal combustion engine according to claim 1, wherein
the fourth gap is circumferentially offset of the first, second and third gaps along the center axis of the piston.

7. The internal combustion engine according to claim 1, wherein
the third stopper is circumferentially offset of the first and second stoppers along the center axis of the piston.

8. The internal combustion engine according to claim 1, wherein
the fourth stopper is circumferentially offset of the first, second and third stoppers along the center axis of the piston.

9. The internal combustion engine according to claim 8, wherein
the piston includes a first, second, third and fourth recess that receive the first, second, third and fourth stoppers, respectively.

10. The internal combustion engine according to claim 1, wherein
the piston includes a plurality of recesses that fittedly receive the stoppers of the plurality of piston rings.

* * * * *